US012768772B2

(12) United States Patent
Juang et al.

(10) Patent No.: US 12,768,772 B2
(45) Date of Patent: Oct. 20, 2026

(54) DEVICE MEASURING A PHYSICAL STATE OF A MATERIAL BY SPECTRUM AND A METHOD THEREOF

(71) Applicant: FAIRTECH CORPORATION, Hsinchu City (TW)

(72) Inventors: Kuan Fu Juang, Hsinchu City (TW); Jui Pao Pan, Hsinchu City (TW)

(73) Assignee: FAIRTECH CORPORATION, Hsinchu City (TW)

( * ) Notice: Subject to any disclaimer, the term of this patent is extended or adjusted under 35 U.S.C. 154(b) by 131 days.

(21) Appl. No.: 18/737,716

(22) Filed: Jun. 7, 2024

(65) Prior Publication Data

US 2024/0328929 A1 Oct. 3, 2024

Related U.S. Application Data

(63) Continuation of application No. 17/365,383, filed on Jul. 1, 2021, now abandoned.

(30) Foreign Application Priority Data

Jan. 26, 2021 (TW) ................................ 110102807

(51) Int. Cl.
*G01N 21/25* (2006.01)

(52) U.S. Cl.
CPC .................................... *G01N 21/25* (2013.01)

(58) Field of Classification Search
CPC .... G01N 21/25; G01N 21/73; G01N 21/8422; G01N 21/89; G01N 2021/8427
See application file for complete search history.

(56) References Cited

U.S. PATENT DOCUMENTS 6,263,291 B1 * 7/2001 Shakespeare .......... G01N 21/89 356/429
2002/0022087 A1 2/2002 Satake et al.
(Continued)

FOREIGN PATENT DOCUMENTS

JP 2001234348 A 8/2001
JP 2004170245 A 6/2004
(Continued)

OTHER PUBLICATIONS

The Notice of Reasons for Refusal of JP family patent Application No. 2023-210225, mailed on Dec. 10, 2024.
(Continued)

*Primary Examiner* — Mohamed K Amara
(74) *Attorney, Agent, or Firm* — MUNCY, GEISSLER, OLDS & LOWE, P.C.

(57) ABSTRACT

A device of measuring a physical state of a material by spectrum is provided. The device includes a first action path, a detector, a processing unit, a control unit, a memory unit, and an artificial intelligence unit. The detector is configured to detect a spectrum of an other material in a plasma state during a deposition process of a material to be measured in the first action path. The processing unit is configured to obtain a deposition state of the material to be measured during the deposition process based on the spectrum of the other material in the plasma state, a chemical reaction between the other material and the material to be measured, and a relation of supplied mole quantity between the other material and the material to be measured. A method of measuring a physical state of a material by spectrum is also provided.

8 Claims, 8 Drawing Sheets

1

(56) References Cited

U.S. PATENT DOCUMENTS

| | | | | |
|---|---|---|---|---|
| 2002/0042193 | A1 | 4/2002 | Noguchi et al. | |
| 2002/0106848 | A1 | 8/2002 | Wack | |
| 2010/0032571 | A1* | 2/2010 | Shelley | G01N 21/3563 250/341.8 |
| 2017/0311898 | A1* | 11/2017 | Bae | G01N 21/25 |
| 2017/0325747 | A1* | 11/2017 | Bae | A61B 5/14553 |
| 2018/0190548 | A1* | 7/2018 | Pan | G01N 21/85 |
| 2020/0221854 | A1* | 7/2020 | Katzarov | A45D 44/005 |
| 2020/0225165 | A1* | 7/2020 | Knuebel | G01N 21/33 |
| 2022/0007582 | A1 | 1/2022 | Lapalme | |
| 2022/0084181 | A1* | 3/2022 | Isken | G06T 7/0004 |
| 2023/0003660 | A1* | 1/2023 | Hartmann | G01J 3/50 |
| 2023/0194435 | A1 | 6/2023 | Bronstein | |
| 2023/0238919 | A1* | 7/2023 | Kunz | G01N 21/6456 250/339.01 |

FOREIGN PATENT DOCUMENTS

| | | | | |
|---|---|---|---|---|
| JP | 2012099226 | A | 5/2012 | |
| JP | 2013057658 | A | 3/2013 | |
| KR | 1020060117738 | A | 11/2006 | |
| TW | 557575 | B | 10/2003 | |
| WO | WO-2005001399 | A2 * | 1/2005 | G01J 3/02 |
| WO | WO-2005012855 | A2 * | 2/2005 | G01N 21/73 |

OTHER PUBLICATIONS

English translation (Dossier translated) of the Notice of Reasons for Refusal of JP family patent Application No. 2023-210225, mailed on Dec. 10, 2024.

The First Office Action of CN family patent Application No. 202110261816.X, mailed on Nov. 30, 2024.

English translation (Dossier translated) of the First Office Action of CN family patent Application No. 202110261816.X, mailed on Nov. 30, 2024.

English translation (Dossier translated) of the Search Report of CN family patent Application No. 202110261816.X, mailed on Nov. 30, 2024.

Pu et al. "The relation between the optical spectral slope and the luminosity for 17 Palomar-Green quasi-stellar objects"; Mon. Not. R. Astron. Soc. 372, 246-252 (2006).

The Notice of Refusal of KR family patent Application No. 10-2021-0076190, mailed on Nov. 21, 2023.

English translation (Brief) of the Notice of Refusal of KR family patent Application No. 10-2021-0076190, mailed on Nov. 21, 2023.

The Notice of Final Refusal of KR family patent Application No. 10-2021-0076190, mailed on Jun. 21, 2024.

English translation (Dossier translated) of the Notice of Final Refusal of KR family patent Application No. 10-2021-0076190, mailed on Jun. 21, 2024.

The Second Office Action of CN family patent Application No. 202110261816.X, mailed on Jul. 24, 2025, with English translation.

Supplementary Search Report of CN family patent Application No. 202110261816.X, mailed on Jul. 24, 2025, with English translation.

"Applications of Indirect Analysis of Plasma Atomic Emission Spectroscopy", Yang et al., Environmental Science and Technology, 1995, 3, 40-44, with English abstract.

"Applications of Near Infrared Spectroscopy for Inorganic Microconstituent Analysis", Shao et al., Acta Chim. Sinica 2012, 70, 2109-2114, with English abstract (see p. 2).

"Determination of Chlorine in Acidic Copper-plating Solution by ICP-AES", Zou et al., Chemical World, 2015, 56 (4), 213-215, with English abstract.

Notice of allowance with cited reference list of KR family patent Application No. 10-2021-0076190, issued on Jun. 16, 2025, with English translation.

* cited by examiner

DEVICE MEASURING A PHYSICAL STATE OF A MATERIAL BY SPECTRUM AND A METHOD THEREOF

PRIORITY CLAIM AND CROSS-REFERENCE

This application is a continuation application to prior-filed U.S. patent application Ser. No. 17/365,383, filed on 1 Jul. 2021, under 35 U.S.C. 120, which claims the benefit of TW Patent Application No. 110102807 filed on 26 Jan. 2021.

FIELD

The present invention is related to a field of monitoring a process relating to plasma. Particularly the present invention is related to a device and a method relating to the monitoring of performing deposition process with plasma by spectrum.

BACKGROUND

In an implementation of related plasma process in the prior art, such as a deposition process using plasma particularly, a deposition result of a workpiece is usually checked after the process is completed. Therefore, an issue, for example but not limited to pool-deposition, over-deposition, impurities, etc., happened in the process cannot be discovered, and even a yield risk is produced due to the undiscovered flow into back end of line (BEOL).

In view of this, the applicant has developed a design of a device and method measuring a physical state of a material by spectrum with continuous research and experiment, therefore the yield and degree of automation are greatly improved through observing and/or control the deposition process on time, and accordingly the yield and degree of automation will be greatly improved.

SUMMARY OF THE INVENTION

A main purpose of the present invention is providing a device and a method measuring a physical state of a material by spectrum. The present invention can detect a spectrum of a material in a first action path, a second action path and/or a tube by a detecting unit, and the deposition state of at least related material to be measured can be obtained by a processing unit based on the spectrum. The present invention can further control an action condition by the processing unit based on a spectrum variation of the related material to be measured.

Therefore, the present invention can control and/or monitor deposition process on time by the above said device and method measuring a physical state of a material by spectrum. Accordingly an advance monitoring can be supplied when a deposit is formed, such as an issue due to the undiscovered flow into back end of line (BEOL), for example but not limited to pool-deposition, over-deposition, impurities, etc., will be prevented from a yield risk.

DETAILED DESCRIPTION

Figure 1:
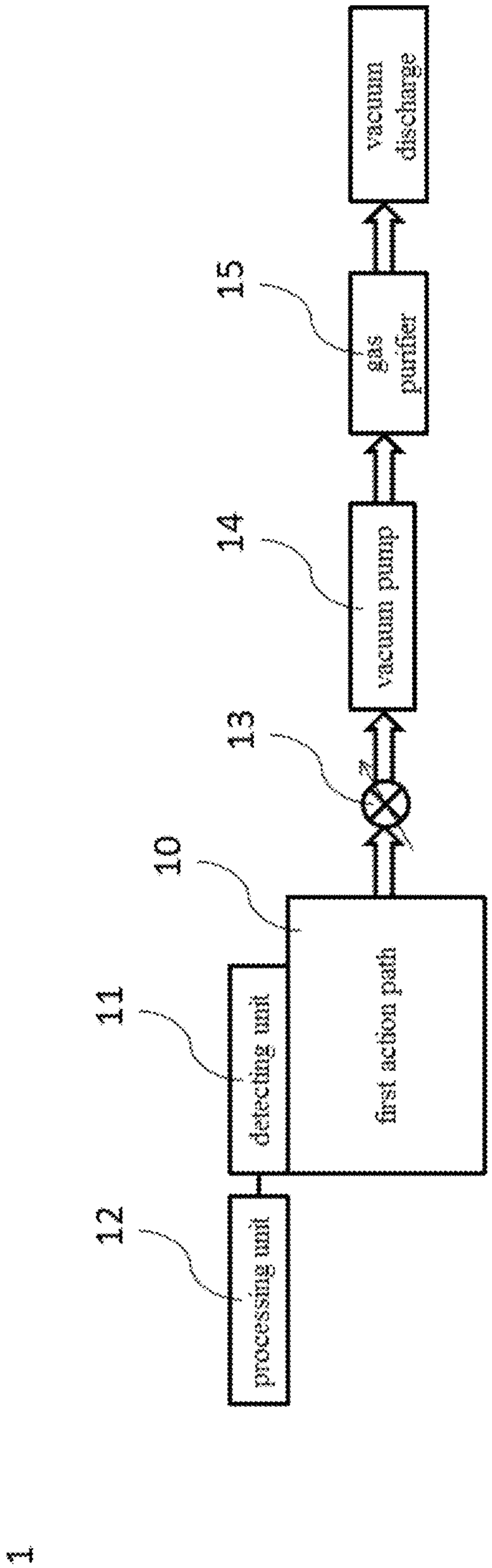
FIG. 1 showing an aspect block diagram of a device measuring a physical state of a material by spectrum of the present invention.

Please refer to FIG. 1, a block diagram of the device 1 for measuring a physical state of a material by spectrum of the present invention. It includes a first action path 10 for containing a material to be measured, a detecting unit 11 for detecting spectrum and a processing unit 12 to obtain the deposition state of the related material to be measured based on the spectrum. Wherein the first action path 10 is a first of an action path. In an example, at least parts of the material to be measured may be in the plasma state, and the spectrum may be the spectrum of the light emitted by the material to be measured in the plasma state. And the spectrum in the first action path 10 can be detected by the detecting unit 11.

Following the processing unit 12 obtaining the spectrum, the processing unit 12 may obtain the information, for example but not limited to the intensity, the wavelength, the full width at half maximum (FWHM), etc. in order to obtain the deposition state relating to the material to be measured through the spectrum of another or the other material. For example but not limited to, when the spectrum intensity of the material to be measured is higher or lower than the threshold, the deposition state of the material to be measured achieving to certain level may be obtained through a relationship of chemical equation and/or a relationship of supplied mole quantity, etc. between another or the other material and the material to be measured, for example but not limited to a thickness, the crystallinity, the degree of coalescence and/or aggregation, etc.

In another example, the first action path 10 may be communicated with a second action path. The material and/or another or the other material to be measured may be contained in the second action path.

Figure 2:
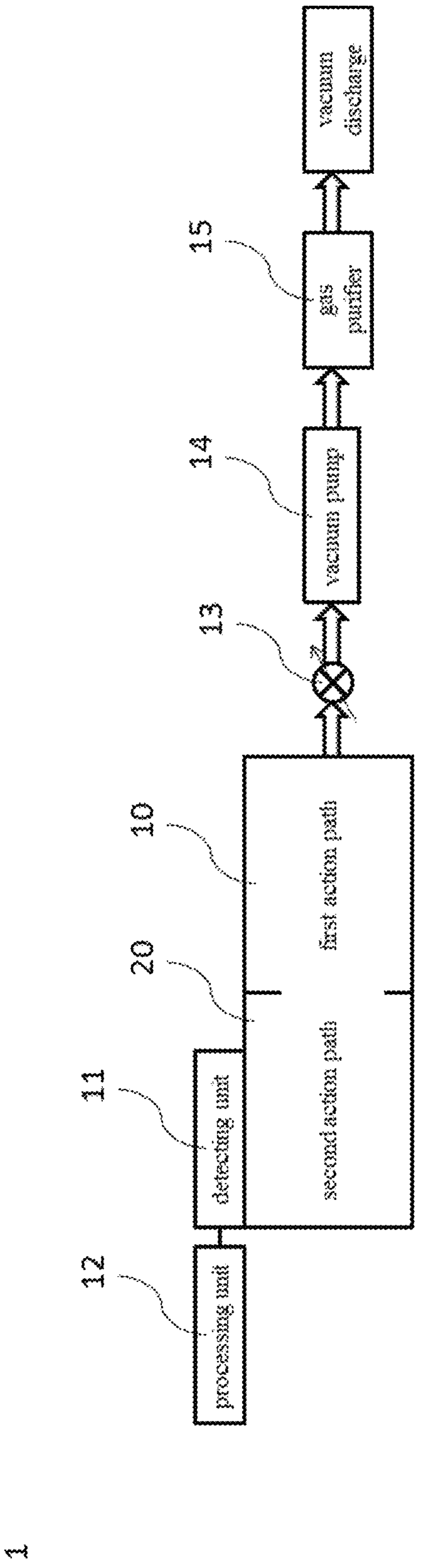
FIG. 2 showing another aspect block diagram of a device measuring a physical state of a material by spectrum of the present invention.

Please refer to FIG. 2, showing another aspect block diagram of the device 1 measuring a physical state of a material to be measured by spectrum of the present invention. The first action path 10 may be communicated with a second action path 20. Wherein the second action path 20 is a second of an action path. At least parts of the material to be measured may come from the second action path 20, and the spectrum in the second action path 20 can be detected by the detecting unit 11. In an example, at least parts of the material to be measured may be in the plasma state, and the spectrum can be the spectrum of the light emitted by the material to be measured in the plasma state. The spectrum in the second action path 20 can be detected by the detecting unit 11. Following the processing unit 12 obtaining the spectrum, the processing unit 12 may obtain the information, for example but not limited to the intensity, the wavelength, the full width at half maximum (FWHM), etc. in order to obtain the deposition state relating to the material to be measured. For example, but not limited to, when the spectrum intensity of the material to be measured is higher or lower than the threshold, the deposition state of the material to be measured in the first action path 10 and/or the second action path 20 achieved to certain level may be obtained, for example but not limited to a thickness, the crystallinity, the degree of coalescence and/or aggregation, etc.

In another example, another or the other material may be in the plasma state, and the spectrum can be the spectrum of the light emitted by the material in the plasma state. And the spectrum in the second action path 20 can be detected by the detecting unit 11. Following the processing unit 12 obtaining the spectrum, the processing unit 12 may obtain the information, for example but not limited to the intensity, the wavelength, the full width at half maximum (FWHM), etc. in order to obtain the deposition state relating to the material to be measured through the spectrum of another or the other material.

For example but not limited to, when the spectrum intensity of another or the other material is higher or lower than the threshold, the deposition state of the material to be measured achieving to certain level may be obtained through a relationship of chemical reaction formula and/or a relationship of supplied mole quantity, etc. between another or the other material and the material to be measured, for example but not limited to the thickness, the crystallinity, the degree of coalescence and/or aggregation, etc.

Figure 3:
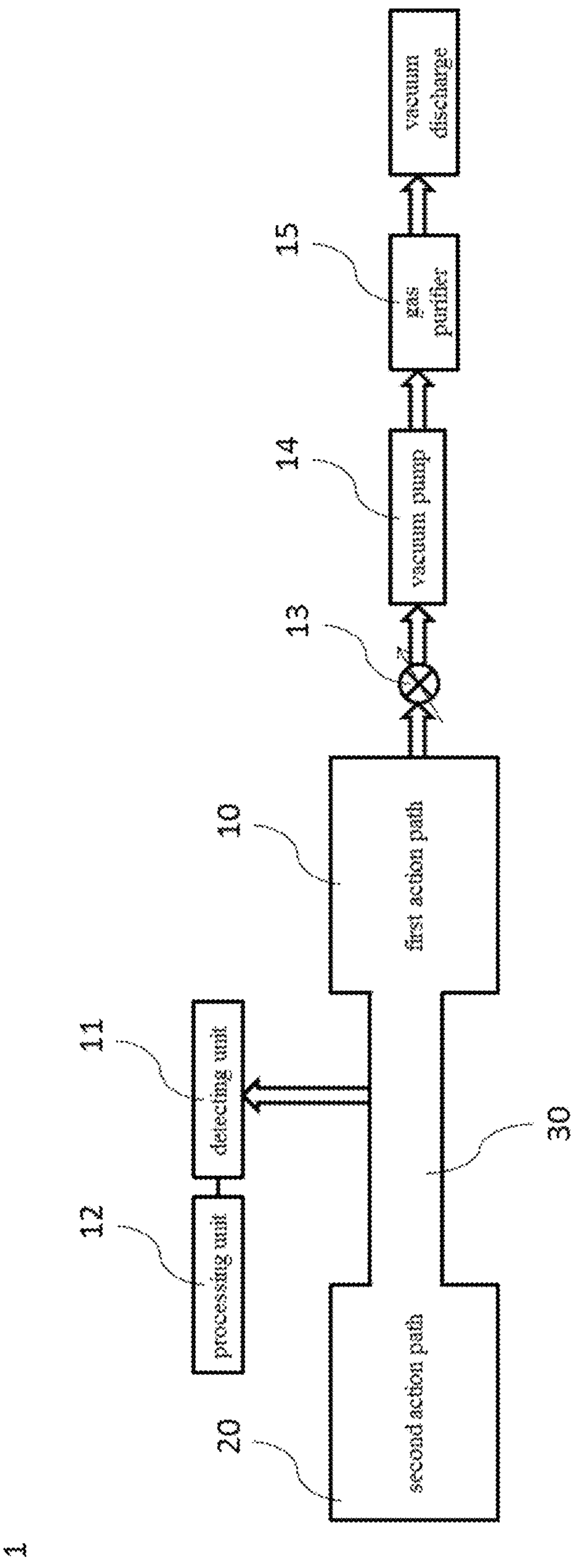
FIG. 3 showing still another aspect block diagram of a device measuring a physical state of a material by spectrum of the present invention.

Please refer to FIG. 3, showing still another aspect block diagram of a device measuring a physical state of a material by spectrum 1 of the present invention. The first action path 10 may be communicated with a second action path 20 via a tube 30, at least part of the material to be measured comes from the second action path 20 via the tube 30, and the spectrum in the tube 30 is detected by the detecting unit 11. In an example, at least part of the material to be measured may be in the plasma state, and the spectrum may be the spectrum of the light emitted by the material in the plasma state. The spectrum in the tube 30 is detected by the detecting unit 11. After the processing unit 12 obtaining the spectrum, the processing unit 12 may obtain the information, for example but not limited to the intensity, the wavelength, the full width at half maximum (FWHM), etc. in order to obtain the deposition state relating to the material to be measured. For example, but not limited to, when the spectrum intensity of the material to be measured is higher or lower than the threshold, the deposition state of the material to be measured in at least one of the tube 30, the first action path 10 and the second action path 20 achieved to certain level may be obtained, for example but not limited to the thickness, the crystallinity, the degree of coalescence and/or aggregation, etc.

In another example, another or the other material may be in the plasma state, and the spectrum can be the spectrum of the light emitted by the material in the plasma state. The spectrum the tube 30 can be detected by the detecting unit 11. Following the processing unit 12 obtaining the spectrum, the processing unit 12 may obtain the information, for example but not limited to the intensity, the wavelength, the full width at half maximum (FWHM), etc. in order to obtain the deposition state relating to the material to be measured through the spectrum of another or the other material. For example but not limited to, when the spectrum intensity of another or the other material is higher or lower than the threshold, the deposition state of the material to be measured achieving to certain level may be obtained through a relationship of chemical reaction formula and/or a relationship of supplied mole quantity, etc. between another or the other material and the material to be measured, for example but not limited to the thickness, the crystallinity, the degree of coalescence and/or aggregation, etc.

The action of the first action path 10 and the second action path 20 as mentioned above may be, for example but not limited to, a physical action and/or a chemical action relating to filling, reaction, compression, depression, heat-up and/or cooling down, etc. The first action path 10 may be for example but not limited to a chamber, a chamber including multively independent and/or dependent reaction area, etc. communicated with each other.

It shall be noted that the material to be measured along with another and the other material as mentioned above may exist in the same action path without reacting, and the reaction will be performed until achieving a workpiece.

The first action path 10 as mentioned above may be communicated with a throttling valve 13, a vacuum pump 14 and a gas purifier 15, etc. Following a reaction material is released or reduced in appropriate amount by the second action path 20 in accordance with the deposition state relating to the material to be measured, a deposition operation of the material will be performed in the first action path 10 through the tube 30. A vacuum discharge will be then achieved by the vacuum pump 14 and gas purifier 15, etc.

The detecting unit 11 as mentioned above may be arranged outside the first action path 10 and/or the second action path 20, to detect the spectrum of the material and/or another or the other material to be measured through such as a window.

The processing unit 12 as mentioned above may be connected to the detecting unit 11 directly or indirectly. The processing unit 12 can be a chip, a processor, a mechanical computer, a circuit and/or a microprocessor, etc., and the item "connected" may be a connection method capable of transmitting a signal or an instruction, such as an electrical connection, a quantum coupling (quantum entanglement) and/or an optical connection.

Particularly, the deposition state of the material and/or another or the other material to be measured may be further obtained by the processing unit 12 as mentioned above based on the spectrum variation of the material and/or another or the other material to be measured. For example, but not limited to, the deposition state of the material and/or another or the other material to be measured may be furthermore obtained by the processing unit 12 based on an intensity variation (such as a slope of the plot of intensity versus time, a slope of the plot of FWHM versus time, etc.) of the spectrum of the material and/or another or the other material to be measured.

More specifically, an action condition of the material and/or another or the other material to be measured is further controlled by the processing unit 12 as mentioned above based on the variation of the spectrum of the material and/or another or the other material to be measured, for example but not limited to a switch of access, or the supply of quantity, temperature, pressure, precursor, catalyst, etc.

Thereby, an early monitoring by the present invention will be supplied instantly when a deposit is formed, so as to avoid for example, but not limited to insufficient deposition, excessive deposition, impurities and other problems of the yield risk which might flow into the back end of line (BEOL) without detection. Furthermore, a deposition process may be observed and/or controlled on time by the present invention, therefore the yield and degree of automation can be greatly improved.

The present invention may be applied to all device and/or any apparatus which require measuring of gas deposition state, including but not limited to physical vapor deposition device, chemical vapor deposition device, etching device and any other relevant device in the semiconductor, photo-electric, panel industries and any other relevant industry. The present invention may also be directly disposed in a remote plasma source device. In addition, the present invention may also be applied in any inspection examination device in the biotechnology, chemistry, applied physics industries and any other relevant industry. Furtherly, the present invention may also be applied to any inspection apparatus or testing platform in the equipment maintenance industry for any of the foregoing industries.

Figure 4A:
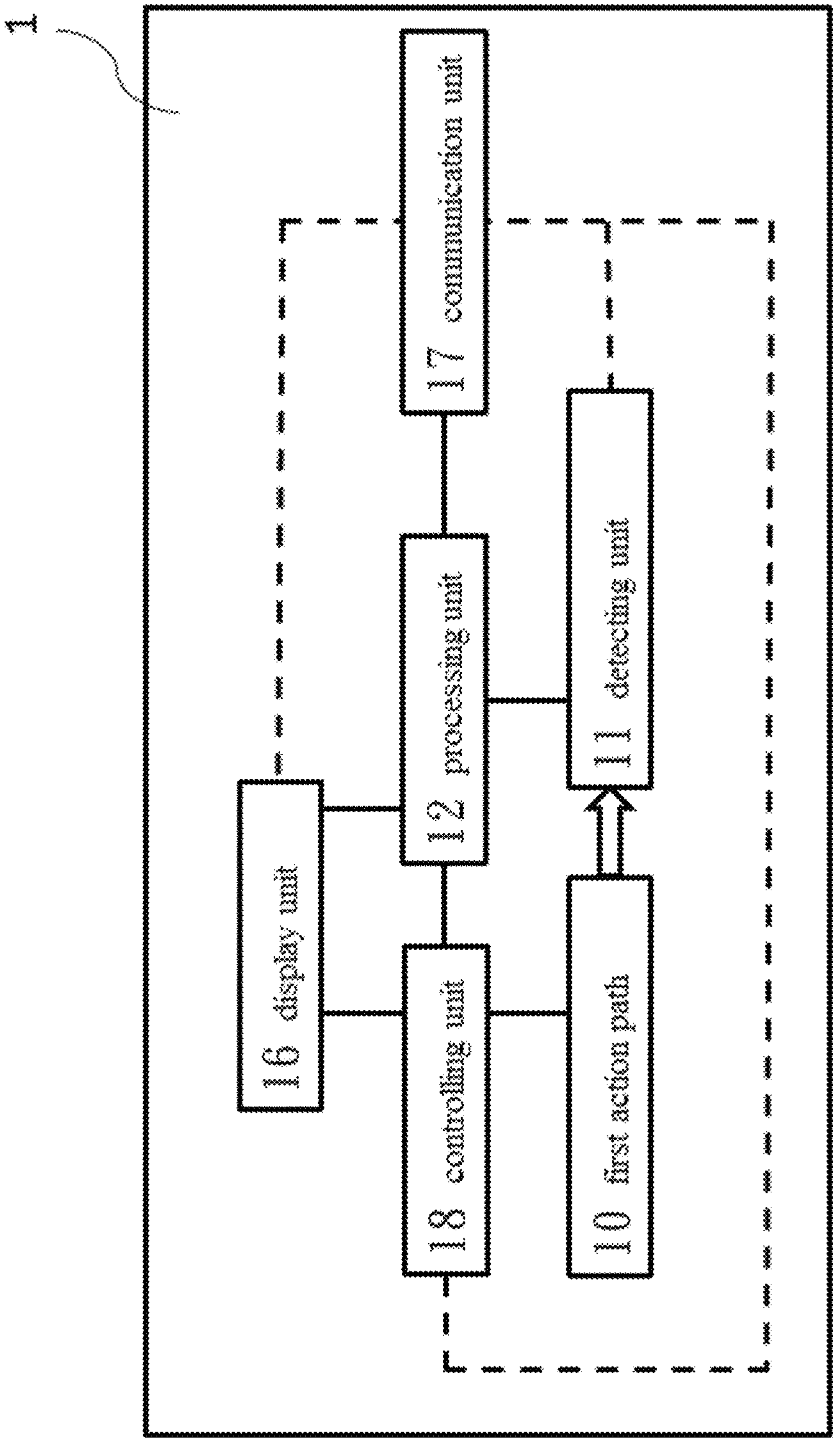
FIG. 4A and FIG. 4B showing the aspect block diagram of a device comprising the other elements and measuring a physical state of a material by spectrum of the present invention.
Figure 4B:
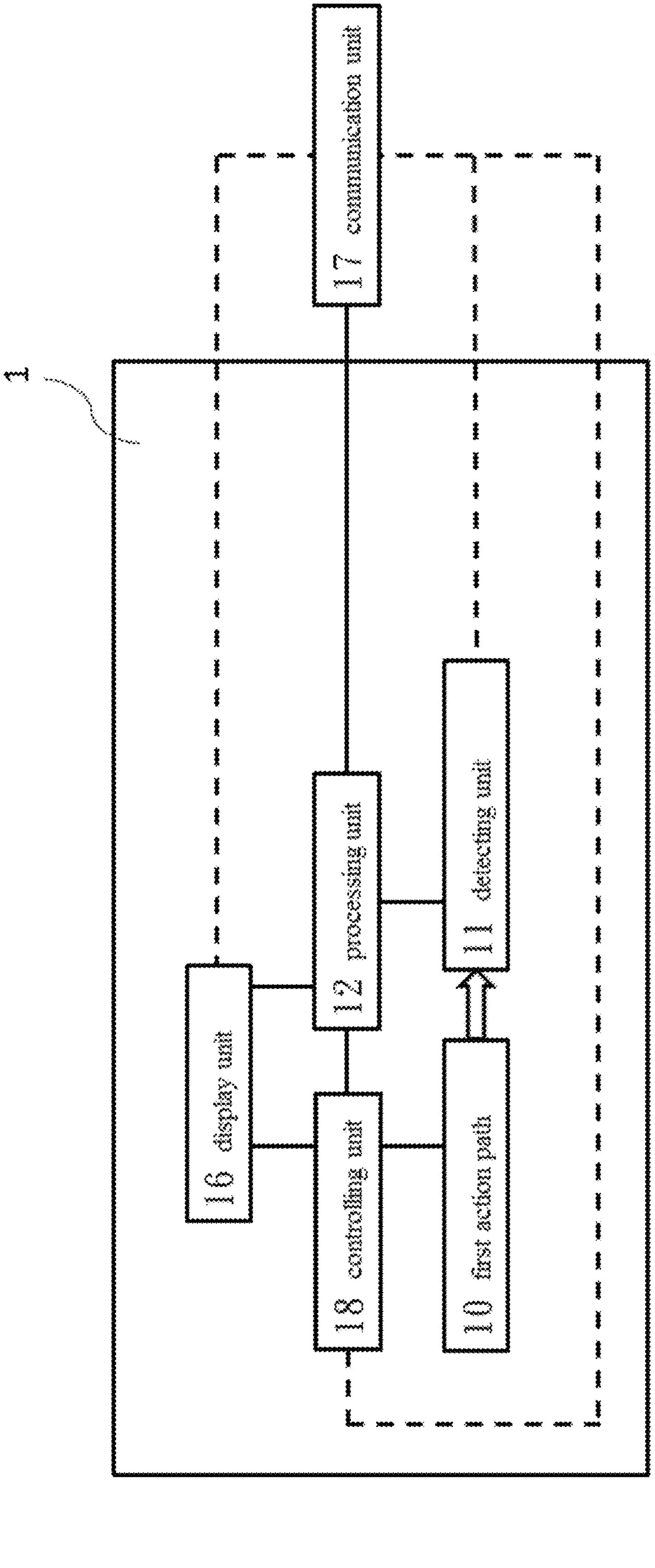

Please refer to FIG. 4A, a device measuring a physical state of a material of the present invention furtherly comprises a display unit 16 at least displaying a related data including the spectrum, a related data of the deposition state or the combination thereof. Wired transmission, wireless transmission, or a combination thereof may be performed by at least one communication unit 17 between the processing unit 12 of a device 1 measuring a physical state of a material by spectrum and the detecting unit 11, the display unit 16 or at least the combination thereof. The communication unit 17 may be contained in the device 1 measuring a physical state of a material by spectrum, or be independent to the device 1 measuring a physical state of a material by spectrum as shown in FIG. 4B.

Each state of one of elements of the device 1 measuring a physical state of a material by spectrum may also be displayed by the display unit 16. The types of the display unit 16 may include and not be limited particularly to liquid crystal displayer (LCD), electronic paper, light signal, micro light emitting diode displayer (micro LED), quantum dot displayer (QLED), organic light emitting displayer (OLED) or mechanical displayer (such as flipped display board, etc.). Additionally, the backlight source of the liquid crystal displayer (LCD) may be a light emitting diode (LED) or a micro light emitting diode (micro LED). Besides the displayers as mentioned above, the display unit 16 may also include a notification module (not shown in Figures), such that a notification signal may be output through different signal types (such as audio, light, etc.) by the display unit 16. In the above implementation aspect, an information such as "the default state of dissociation gas is 20 ppm", "the actual state is 18 ppm", "the theoretical state is 20 mg", "the adjustment parameter is 2 mg", etc. can be displayed by the display unit 16.

For example but not limited to, when an internal volume of the first action path 10 is 1 ml and when there is default dissociated gas 20 ppm contained in the first action path 10, the dissociated gas 20 mg (e.g. the theoretical state) is commanded to be injected into the first action path 10 by the processing unit 12, such that there will be the dissociated gas 20 ppm (e.g. the default state) contained in the first action path 10 for an usage of related process (such as reaction chamber cleaning, thin film etching, plasma-assisted deposition etc.). Detected by the detecting unit 11, an actual detection result of the dissociated gas in the first action path 10 is 18 ppm (e.g. the actual state), and this presents that an usage of the dissociated gas is continued to be in the process. Following a detected result of the dissociated gas received by the processing unit 12 is 18 ppm, and comparing a difference between 18 ppm and 20 ppm (e.g. calculating a difference between the actual state and the default state of the dissociated gas), then the processing unit 12 may obtain a result that 2 ppm (e.g. adjustment parameter) of the dissociated gas shall be supplied to the first action path 10 such that the dissociated gas in the first action path 10 may achieve the theoretical state of 20 ppm (to finish the reaction). Subsequently, following an user obtains a gas state data of the dissociated gas through such as a report and/or a light, he may input a command to the processing unit 12 manually, such that the dissociated gas can be continued to be injected into the first action path 10 (e.g. the theoretical state) by the processing unit 12, therefore the dissociated gas in the first action path 10 will be 20 ppm (e.g. the default state). Following an injecting, until the dissociated gas in the first action path 10 is detected by the detecting unit 11 as 20 ppm (e.g. the actual state), a theoretical state value to make the first action path 10 contain 20 ppm of dissociated gas will be completed, which means the process reaction shall be completed, and that the gas will not be required to inject into the first action path 10.

Additionally, a device measuring a physical state of a material by spectrum 1 further comprises a controlling unit 18 connected to the processing unit 12, in order to replace the processing unit 12 to control a reaction condition (for example but not limited to a switch of supply, quantity, temperature, pressure, supply of precursor, supply of catalyst, etc. of the material and/or another or the other material to be measured) of the material and/or another or the other material to be measured based on the spectrum variation of the material and/or another or the other material to be measured. The processing unit 12 may be connected to the controlling unit 18 directly or indirectly. The controlling unit 18 may be a chip, a processor, a mechanical computer, a circuit and/or a microprocessor, etc., and the connection may be a connection method capable of transmit a signal or an instruction, such as an electrical connection, a quantum coupling (quantum entanglement) and/or an optical connection, etc.

A setting instruction received by the controlling unit 18 may be a manual injecting instruction and/or an instruction output by the processing unit 12. The instructions comprise the control parameter(s). A cooperate method between the controlling unit 18 and the display unit 16 may be: following the user views the display unit 16, identifying a control content to be adjusted; and inputting an injecting instruction manually to the controlling unit 18, such that the controlling unit 18 can tune a following related operating procedure. Or an automatically monitoring mechanism (Figures not shown) between the controlling unit 18 and the processing unit 12 may be set, the automatically monitoring mechanism can mechanically identify the action condition to be adjusted, and an instruction will be output to the controlling unit 18, in order to provide the following related procedure operated to the controlling unit 18.

Figure 5:
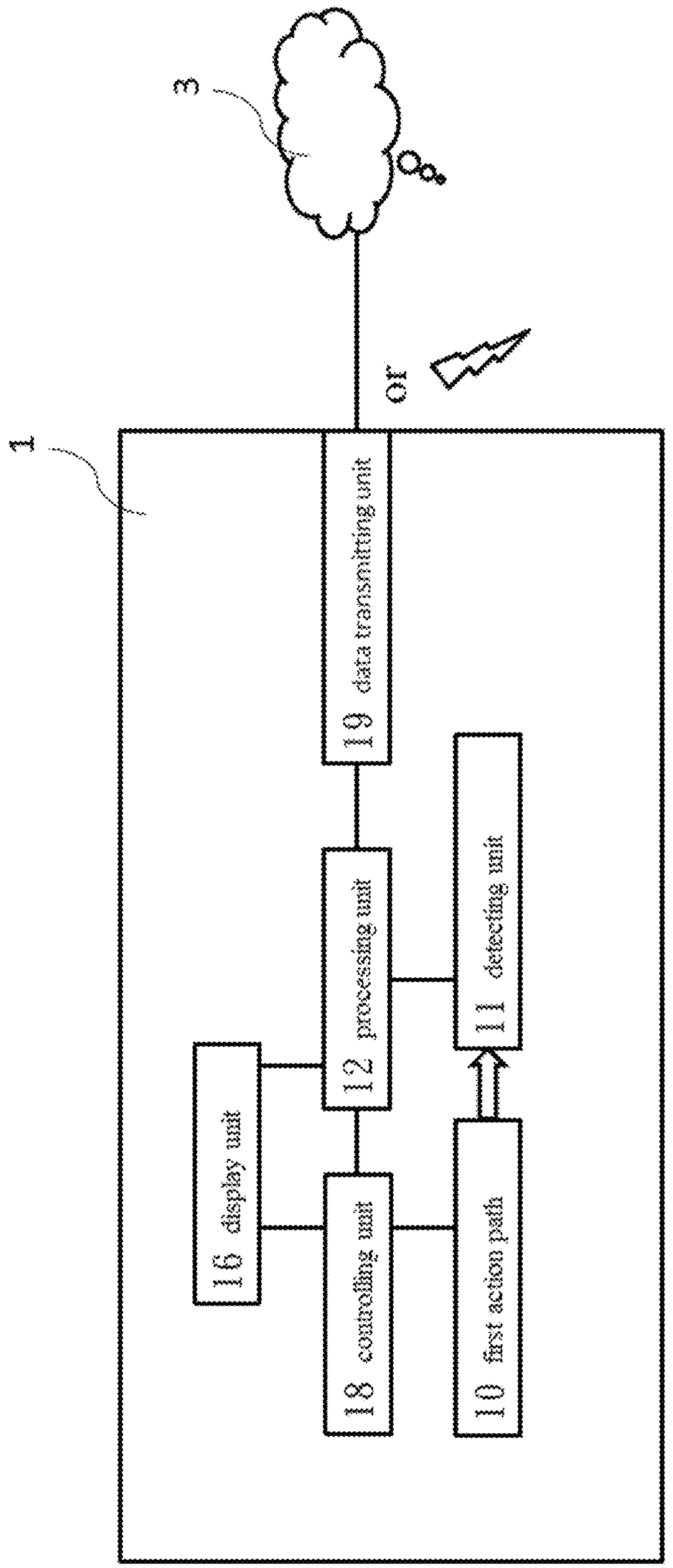
FIG. 5 showing another aspect block diagram of a device comprising the other elements and measuring a physical state of a material by spectrum of the present invention.

As shown in FIG. 5, a device 1 measuring a physical state of a material by spectrum further comprises a data transmitting unit 19 connected to the processing unit 12, and the data transmitting unit 19 may be connected to external network 3 through wired transmission, wireless transmission or a combination thereof, so that an artificial intelligence can be used for a big data calculation and the processing unit 12 and/or controlling unit 18 will be commanded to operate based on the big data calculation. The external network 3 may be an internal network of the manufacturing site, an internal network across the manufacturing sites, an internet or at least two thereof. The big data calculation may be the artificial intelligence, a cloud computing, etc. with computing and/or storage capabilities. And big data calculations can be performed by computers, laptops, mobile phones, portable mobile devices, servers, supercomputers, mainframes, distributed computing architectures, etc. with computing and/or storage capabilities such as artificial intelligence and cloud computing, etc. The big data calculation may perform a statistic based on an attribute (for example, material, previous or following process, design, etc.) of a manufacturing site, a machine, a raw material, and a workpiece, or the spectrum, the yield or at least two thereof, in order to provide a basis for improvement. However, the present invention is not limited to thesc. It shall be noted that the display unit 16 and/or the communication unit 17 described above can also be combined in this aspect with reference to the above implementation aspect.

A device 1 measuring a physical state of a material by spectrum further comprises a memory unit 41 connected to the processing unit 12 and the data transmitting unit 19. The memory unit 41 may be arranged between the processing unit 12 and the data transmitting unit 19, or the processing unit 12 may be arranged between the memory unit 41 and the data transmitting unit 19. Namely, the memory unit 41 can be contained in a device 1 measuring a physical state of a material by spectrum, or the memory unit 41 may be independent to a device 1 measuring a physical state of a material by spectrum, and the memory unit 41 may be connected to the data transmitting unit 19 by wired transmission, wireless transmission or a combination thereof, with at least storage conditions, the theoretical state, the actual state, the preset state, the adjustment parameter, the application software of the processing unit 12, the processing unit 12 processes data, etc. or at least a combination of the two. The memory unit 41 may include at least one storage medium from each of the following: Flash memory, hard disk, multimedia card micro memory, card type memory (for example, secure digital (SD) card or extreme digital (XD) card), random access memory (RAM), static random access memory (SRAM), read-only memory (ROM), electrically erasable programmable read-only memory (EEPROM), programmable read-only memory (PROM), magnetic memory, magnetic disk or CD, or the combination thereof. Additionally, a program stored in the memory unit 41 may include operating system programs and various application programs.

Said memory unit 41 may be provided to the network 3 for usage and storage data in order to analyze the data, specifically such as storing the reaction condition, the theoretical state, the actual state, the default state and/or the adjustment parameter and reaction time, etc. of the material and/or another or the other material to be measured, but the present invention is not limited to these.

Figure 6:
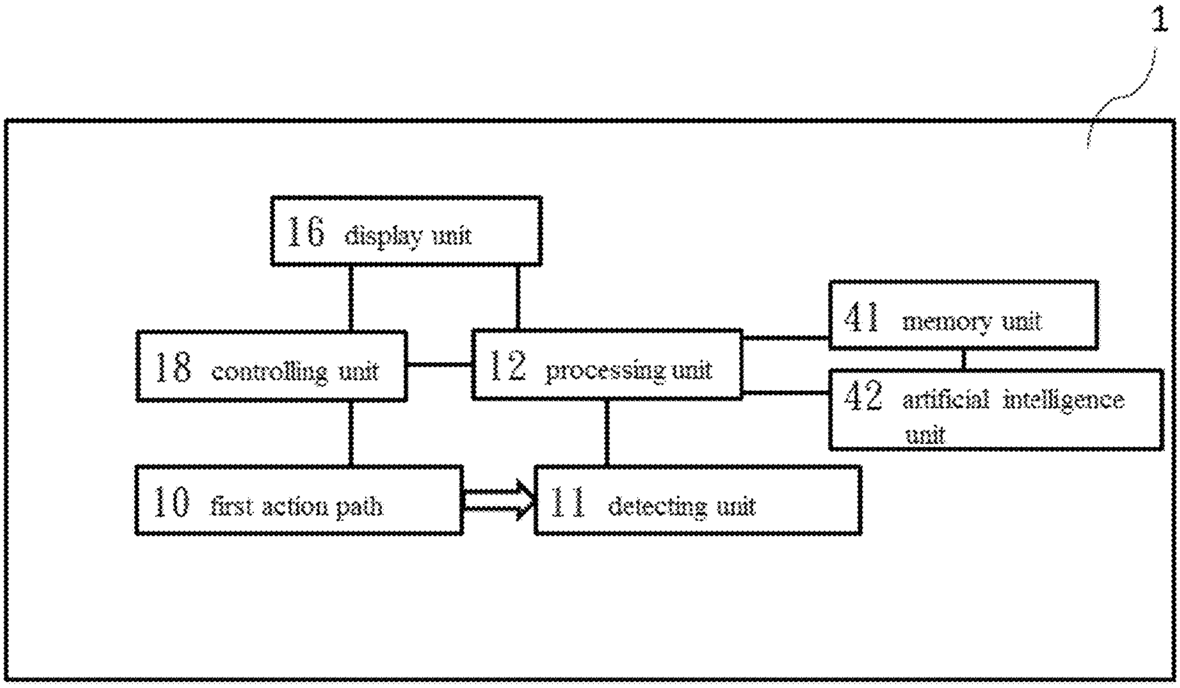
FIG. 6 showing still another aspect block diagram of a device comprising the other elements and measuring a physical state of a material by spectrum of the present invention.
Figure 7:
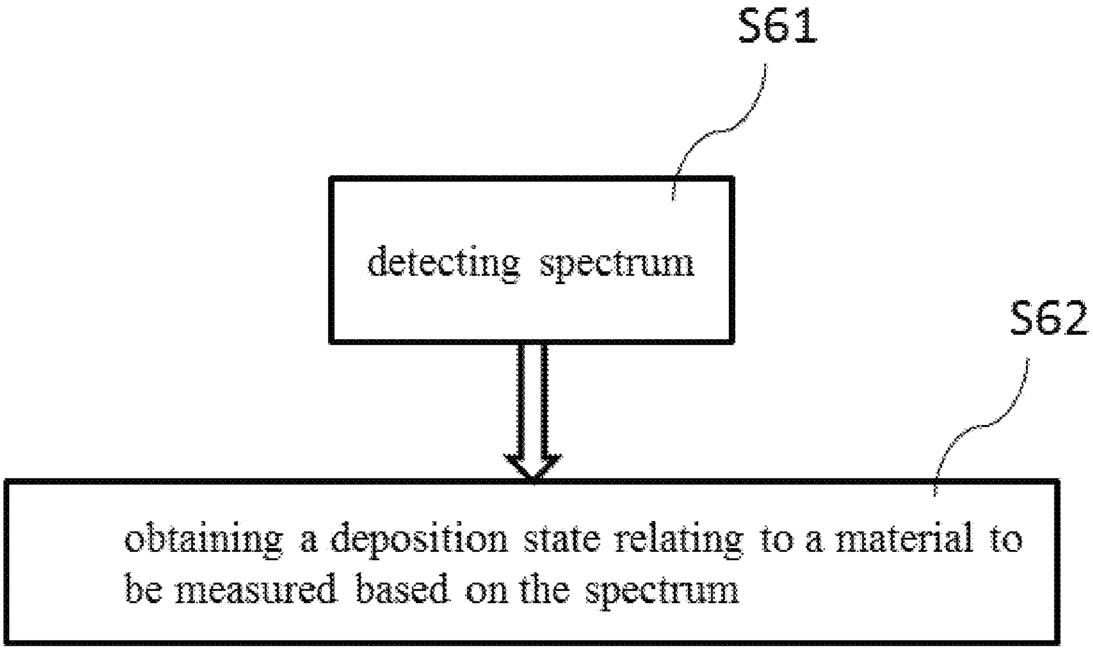
FIG. 7 showing a block diagram of a method measuring a physical state of a material by spectrum of the present invention.

A device 1 measuring a physical state of a material by spectrum may furtherly comprise a memory unit 41 and an artificial intelligence unit 42, as shown in FIG. 6. The processing unit 12 can be connected to the memory unit 41 and the artificial intelligence unit 42; the memory unit 41 stores the spectrum, the reaction condition, the theoretical state, the actual state, the default state, the adjustment parameter or at least two thereof of the material and/or another or the other material to be measured; The artificial intelligence unit 42 reads the spectrum, the reaction condition, the theoretical state, the actual state, the default state, the adjustment parameter or at least two thereof of the material and/or another or the other material to be measured, in order to perform a big data algorithm by the artificial intelligence, and command the controlling unit 18 to operate based on the big data algorithm. The memory unit 41 and the artificial intelligence unit 42 may be contained in a device 1 measuring a physical state of a material by spectrum, but the spectrum, the reaction condition, the theoretical state, the actual state, the default state, the adjustment parameter etc., or at least two thereof of data of the material and/or another or the other material to be measured may still be shared with the network 3. It should be noted that the display unit 16, the communication unit 17, and/or the data transmission unit 19 can also be combined in this aspect with reference to the above implementation aspect.

Another implementation mode of the device 1 for measuring the physical state of a substance by spectrum can be the memory unit 41 connected to the processing unit 12, the artificial intelligence unit 42 connected to the memory unit 41, and an automated program unit connected to the artificial intelligence unit 42 and the control unit 18. Said artificial intelligence unit 42 may read the memory unit 41 and use the artificial intelligence to perform the big data algorithm, such that an operation of the automated program unit can perform. It shall be noted that, the display unit 16, the communication unit 17 and/or the data transmitting unit 19 may also be combined with the present aspect with reference to the aspect mentioned above. It still shall be noted that, each aspect of the detecting unit 11, the throttling valve 13, the vacuum pump 14, the gas purifier 15, the second action path 20 and the tube 30 may be applied to every aspect of FIG. 4A to FIG. 6.

Said automated program unit may receive an instruction output by the artificial intelligence unit 42 to measure a physical state of a material of a device 1 with spectrum. When a device 1 measuring a physical state of a material by spectrum is used for process, it may be integrated with the other device and/or elements (such as a plasma cleaning device), e.g. the automated program unit may not only control a device 1 measuring a physical state of a material by spectrum but also control the other integrated device to perform the automated program, such as cleaning procedures, maintenance procedures or inspection procedures, etc.

A method measuring a physical state of a material by spectrum comprising step S61 and step S62 is also provided by the present invention, as shown in FIG. 6. In step S61, detecting spectrum. Particularly, a spectrum may be detected by a detecting unit 11, and the spectrum may be detected from a first action path, or the spectrum may be detected from a second action path communicated with the first action path, or the spectrum may be detected from a tube communicated with the first action path and the second action path. In step S62, a deposition state relating to a material to be measured can be obtained based on the spectrum. Particularly, a deposition state of related material to be measured may be acquired by a processing unit 12 based on the spectrum.

A method measuring a physical state of a material by spectrum of the present invention further comprises controlling an action condition of the material and/or another or the other material to be measured based on a variation of the spectrum relating to the material and/or another or the other material to be measured, following step S61, for example but not limited to, a switch of supply, quantity, temperature, pressure, supply of precursor, supply of catalyst, etc. of the material and/or another or the other material to be measured. The other details of this method are as described above and will not be repeated.

It shall be noted that the "connecting" may be a connection method capable of transmit a signal or an instruction, such as an electrical connection, a quantum coupling (quantum entanglement) and/or an optical connection etc., and the sequence of the connection may be direct connection or indirect connection. Additionally, a pre-calculated data (such as a parameter, a setting, an equation, a logic, etc.) of all said calculations, intermediate calculation data (such as a numerical value, a logical judgment, etc.) and a calculation result data may also be stored by the memory unit, and the memory unit may be simultaneously transmitting with the processing unit. However, the present invention is not limited to these. The wired transmission, wireless transmission or a combination thereof means wired first and wireless later, wireless first and wired later, or simultaneously wired and wireless, etc.

It furthermore shall be noted that the other detecting unit may be added correspondingly in the situation adding the other action path and/or tube, such that the physical state of the material in the other action path and/or tube can be measured by the spectrum through said method. Or the physical state of the material in the other action path and/or tube may be measured by spectrum with a single or few detecting unit through window such as movements or rotations. Additionally, the detecting unit may be integrated with the processing unit into one element/module, and all units connected to the processing unit can be connected to the element/module.

A device and method measuring a physical state of a material by spectrum of the present invention may be used for all process equipment required to detect the deposition state, especially equipment which uses plasma. Specifically and for example, a chamber required injecting the material and performing deposition, modifying, etc. Additionally, an advance monitoring can be supplied when a deposit is being formed by the present invention, such that an issue, for example but not limited to insufficient deposition, over-deposition, impurities, etc., can be prevented from a yield risk of not be discovered before a defect transported to back end of line (BEOL). Furthermore, a deposition process can be observed and/or controlled on time, therefore the yield and degree of automation will be greatly improved.

Still furthermore, a device and method measuring a physical state of a material by spectrum may perform statistic based on large amount of data by the big data calculation, to provide a basis for improvement.

The present invention has been described in detail from the above. However, it can be only a preferred embodiment of the present invention, rather than the limitation of the implement scope of the present invention. That is to say, all equal changes and modifications made in accordance with the scope of the patent application of the present invention shall still fall within the scope of the patent of the present invention.

What is claimed is:

1. A device of measuring a physical state of a material by spectrum, comprising:

a first action path where a material to be measured and an other material are contained in, the first action path is a first of an action path, wherein the other material and the material to be measured are related in a chemical reaction;

a detector configured to detect a spectrum of the other material in a plasma state during a deposition process of the material to be measured;

a processing unit connected with the detector, comprising a chip, a processor, a mechanical computer, a circuit, a microprocessor or a combination thereof, configured to obtain a deposition state of the material to be measured during the deposition process based on the spectrum of the other material in the plasma state, the chemical reaction between the other material and the material to be measured, and a relation of supplied mole quantity between the other material and the material to be measured;

a control unit connected to the processing unit, configured to control a reaction condition of the other material based on a variation of the spectrum of the other material in the plasma state during the deposition process;

a memory unit connected to the processing unit, configured to store the spectrum, the reaction condition, a theoretical state, a default state, an actual state, and an adjustment parameter of the material to be measured; and an artificial intelligence unit connected to the processing unit, configured to perform a big data algorithm based on at least two of the spectrum of the other material, the reaction condition, the theoretical state, the default state, the actual state, and the adjustment parameter of the material to be measured, wherein the deposition state is a thickness, a crystallinity, a degree of coalescence, an aggregation or a combination thereof, and wherein the variation of the spectrum of the other material in the plasma state includes a slope of a plot of full width at half maximum (FWHM) versus time during the deposition process.

2. The device of claim 1, wherein the spectrum of the other material in the plasma state in the first action path is detected by the detector.

3. The device of claim 1, wherein the first action path is communicated with a second action path, at least a part of the other material comes from the second action path, and the spectrum of the other material in the plasma state in the second action path is detected by the detector, the second action path is a second of an action path.

4. The device of claim 1, wherein the first action path is communicated with a second action path via a tube, at a least part of the other material comes from the second action path via the tube, and the spectrum of the other material in the plasma state in the tube can be detected by the detector, the second action path is a second of an action path.

5. A method of measuring a physical state of a material by spectrum, the method comprising:

detecting a spectrum of an other material in a plasma state through a detector during a deposition process of a material to be measured, wherein the other material and the material to be measured are related in a chemical reaction;

obtaining a deposition state of the material to be measured during the deposition process based on the spectrum of the other material in the plasma state, the chemical reaction between the other material and the material to be measured, and a relation of supplied mole quantity between the other material and the material to be measured, through a processing unit comprising a chip, a processor, a mechanical computer, a circuit, a microprocessor or a combination thereof, wherein the processing unit is connected with the detector, and wherein the deposition state is a thickness, a crystallinity, a degree of coalescence, an aggregation or a combination thereof of the material to be measured, and the deposition state is obtained through:

storing the spectrum of the other material, a reaction condition, a theoretical state, a default state, an actual state, and an adjustment parameter of the material to be measured during the deposition process; and performing a big data algorithm based on at least two of the spectrum of the other material, the reaction condition, the theoretical state, the default state, the actual state, and the adjustment parameter of the material to be measured; and controlling the reaction condition through the processing unit and based on a variation of the spectrum of the other material in the plasma state during the deposition process, wherein the variation of the spectrum of the other material in the plasma state includes a slope of a plot of full width at half maximum (FWHM) versus time during the deposition process.

6. The method of claim 5, wherein performing the big data algorithm comprises:

reading the at least two of the spectrum of the other material, the reaction condition, the theoretical state, the default state, the actual state, and the adjustment parameter of the material to be measured from a memory unit connected to the processing unit.

7. The method of claim 5, wherein the deposition state of the material to be measured is reached a certain level when an intensity of the spectrum of the other material in the plasma state is higher than or lower than a threshold.

8. The method of claim 5, wherein the reaction condition comprises a switch of supply, quantity, temperature, pressure, supply of precursor, supply of catalyst of the material to be measured.

* * * * *